Jan. 20, 1953 T. L. FAWICK 2,626,034
CENTRIFUGAL CLUTCH WITH REMOVABLE CANTILEVER SPRING
Filed July 8, 1949 2 SHEETS—SHEET 1

INVENTOR.
THOMAS L. FAWICK
BY Willard D. Eakin
ATTORNEY

Jan. 20, 1953  T. L. FAWICK  2,626,034
CENTRIFUGAL CLUTCH WITH REMOVABLE CANTILEVER SPRING

Filed July 8, 1949 2 SHEETS—SHEET 2

INVENTOR.
THOMAS L. FAWICK

BY Willard D. Eakin

ATTORNEY

Patented Jan. 20, 1953

2,626,034

UNITED STATES PATENT OFFICE 2,626,034

CENTRIFUGAL CLUTCH WITH REMOVABLE CANTILEVER SPRING

Thomas L. Fawick, Cleveland, Ohio, assignor to The Fawick Airflex Company, Inc., a corporation of Indiana Application July 8, 1949, Serial No. 103,588

4 Claims. (Cl. 192—105)

This invention relates to centrifugal clutches and especially clutches such as are described and claimed in my U. S. Patent No. 2,375,909, granted May 15, 1945.

The chief objects of the present invention are to provide improved spring means opposed to the centrifugal force of frictional drive members and especially to provide for ease and economy of assembly and disassembly and substitution of parts.

Figure 1:
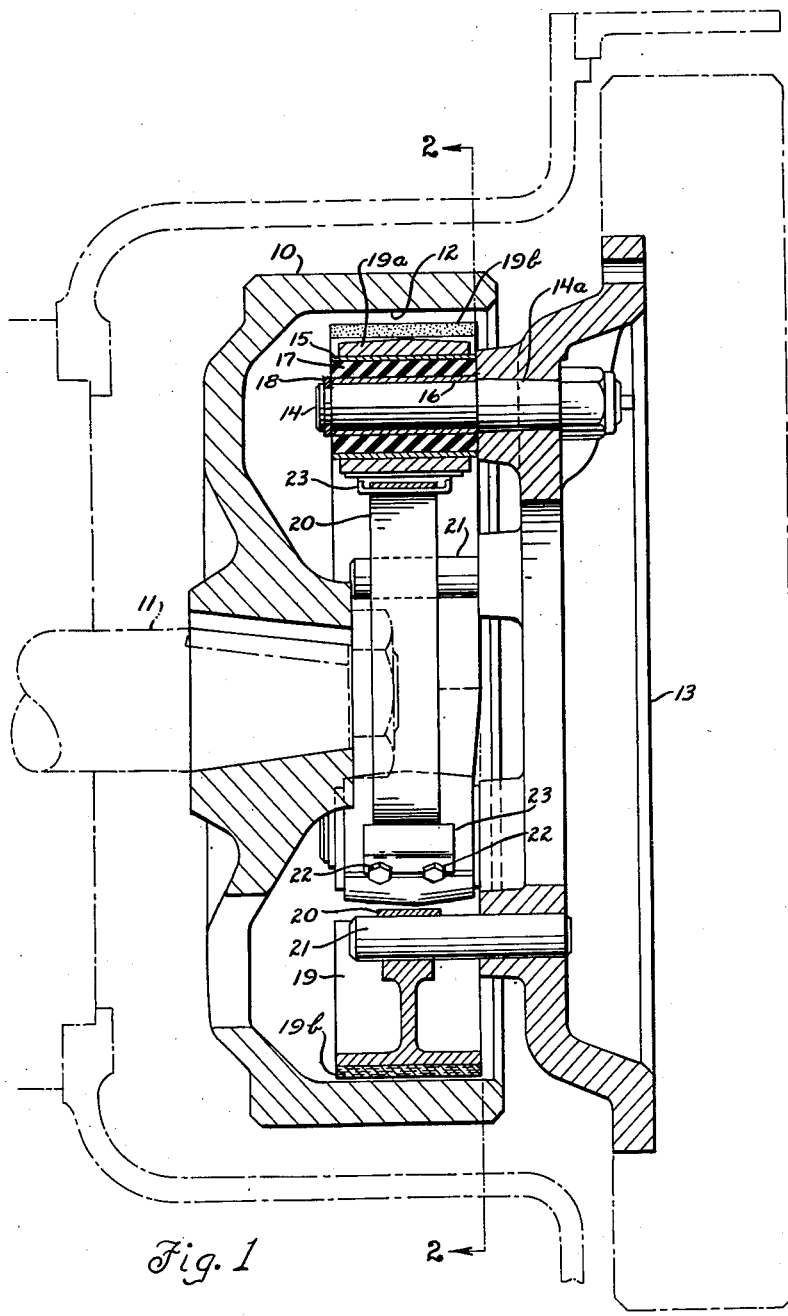
Fig. 1 is an axial section of a clutch embodying my invention in its preferred form, on line 1—1 of Fig. 2.

The embodiment here shown comprises a bell-shaped driven member 10 secured upon the driven shaft 11 and having a frictional inner face 12 for engagement by a set of centrifugal structures pivotally mounted upon a driving member 13.

The pivotal support for each of the centrifugal structure comprises a pin or stud 14 formed with a tapered base portion 11ª seated in a tapered hole extending through the driving member 10 and held therein by a nut 14 on the pin. The projecting stud portion of each pin has mounted thereon an annular cushioning assembly comprising an outer metal shell 15, an inner metal shell 16 and an annular body or bushing 17 composed of natural or synthetic rubber which occupies the annular space between the metal members and preferably resists, yieldably, relative angular movement of the two.

This rubber bushing assembly can be of either the compression type, in which the rubber member is vulcanized to the inner metal member and forced axially into the outer shell, so that its axial recoil maintains it under strong radial compression, or it can be of the axially-clamped type, each of those types of rubber bushing assemblies being well known in the rubber-bushing art, but preferably, for economy of manufacture, it is of the type in which the rubber member is given strong adhesion to the inner and outer metal members by being mold-vulcanized in place between them under high pressure, with the use of a suitable adhesive, in accordance with practice well known in the art.

The rubber-bushing assembly as described is held upon the stud by a snap-ring 18 mounted in an annular groove in the outer end portion of the stud. The fit of the inner metal member 16 on the stud 14, and the fit of the outer metal member in the hub 19ª of a centrifugal member 19, can be a strong, frictional fit, so that rotative movement of the member 19 induced by centrifugal force will be yieldingly resisted by torsional strains in the rubber, or the springs hereinafter described can be adapted to provide all of the necessary yielding force opposed to the centrifugal force of the pivoted structures, in which case it is permissible for the inner metal member 16 of the bushing assembly to be rotatable upon the stud 14, alignment being maintained by spring-latching means such as the snap ring 18 coacting with the member 16 and by a strong frictional fit of the outer shell 15 in the hub 19ª.

Each of the centrifugal members 19 is faced with brake-lining material 19ᵇ for engagement with the face 12 of the driven member 10. The hinge axis of each of the centrifugal members is at a substantial distance radially inward from the face 12 of the driven member and because of this a desirable amount of self-energizing effect is provided when the direction of drive is counterclockwise, Fig. 2.

The improved spring means, heretofore referred to as being opposed to outward movement of the pivoted centrifugal members, comprises a set of flat springs 20, 20 for the centrifugal members 19, 19 respectively.

Each spring 20 bears, at a position near its middle, against the radially inner side of a stud 21 press-fitted in and projecting axially from the driving member 13. At the inner corner of its outer end the member 19 has secured thereto by a pair of cap-screws 22, 22 a spring-seat stamping 23 having a channel or U-shaped portion for receiving an end portion of the spring and holding it against lateral movement and against radially inward movement with relation to the member 19 while permitting it to have lengthwise sliding movement on the floor of the channel.

An identical stamping, 23, for the other end of the spring, is similarly secured to the hub portion 19ª of the centrifugal member 19.

Figure 2:
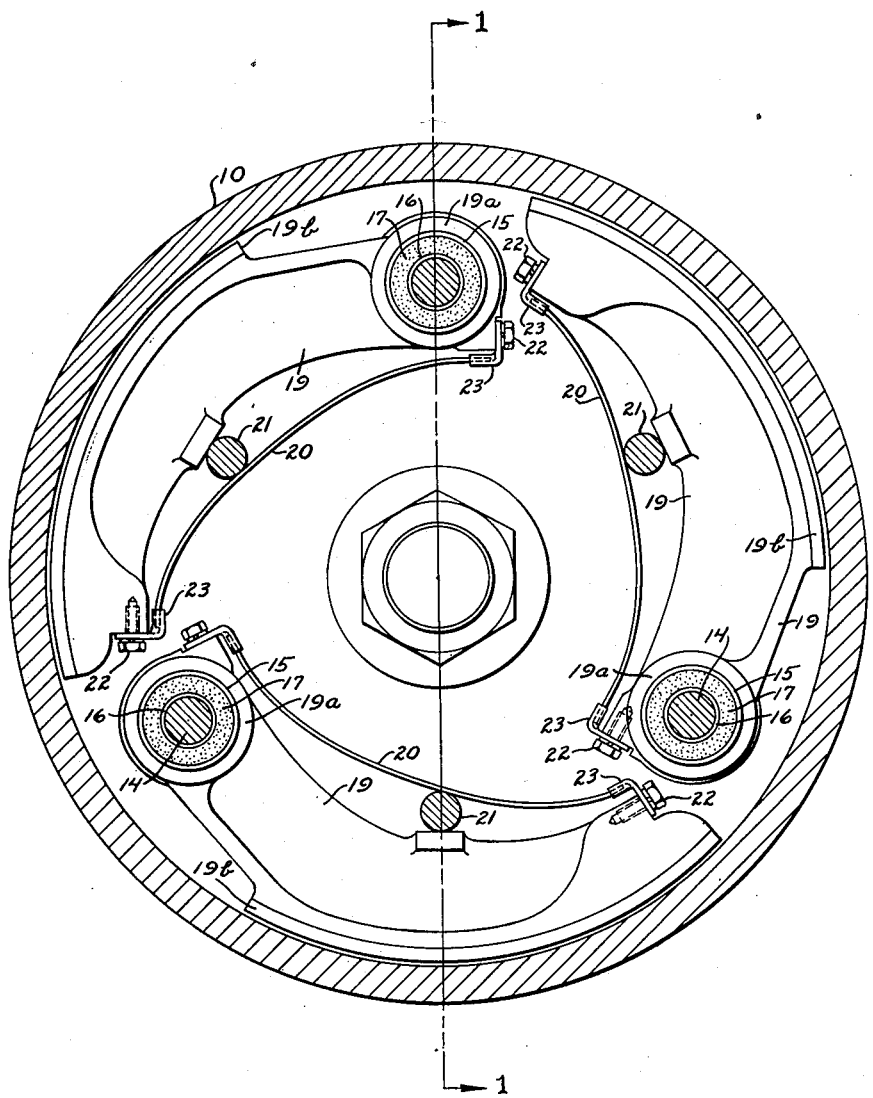
Fig. 2 is a transverse section, on line 2—2 of Fig. 1.

Each of the studs 21 serves as an abutment for straining of the spring and also as a stop for the centrifugal member 19 in its inward, clutch-disengaging, movement, as is shown clearly in Fig. 2.

Each of the stampings 23, 23 is so shaped and proportioned that its spring-seating channel portion is at a distance radially inward from the adjacent face of the member 19 and therewith defines an open space 23 of slightly greater radial dimension than the thickness of the end portion of the spring. This permits placement and removal of the spring by suitably bending it and passing it axially into or out of its working position. In mounting the spring its middle portion can be engaged with and moved along the stud 21 for a substantial distance before its ends will overlie their sockets in the members 23, the stud 21 being of suitable length to provide that advantage, for easy manual holding of the spring in a somewhat flattened condition. When the spring has been moved a suitable distance along the stud and is then released its end portions come to rest in their respective sockets, with the spring still under appropriate pre-loading strain for performance of its function.

The construction as described also is such that the several pivotal structures, with or without the springs, can be individually preassembled and readily mounted upon, or removed from, the studs 14.

Modifications are possible without departure from the scope of the invention as defined by the appended claims.

I claim:

1. A centrifugal clutch comprising a driven member having an internal frictional-engagement face, a driving member, a set of centrifugal members pivoted on said driving member for swinging movement thereon toward and from said engagement face, a retracting spring of the cantilever type for each of said centrifugal members, the driving member having a seat for the middle portion of each of the springs and each centrifugal member having two seats at different distances from its pivotal axis for the respective end portions of its spring, said seats for each spring having such clearances as to permit the spring when deformed by bending strain to be passed axially of the assembly into approximately final position and to assume final position in relation to its seats upon relaxing of the strain, the seats for each spring comprising means automatically interlocking with a side edge of the spring, upon such relaxing, to prevent axial displacement of the spring.

2. A centrifugal clutch as defined in claim 1 in which cushioning material having substantially the resilient deformability of vulcanized soft-rubber is so interposed between the driving member and each of the centrifugal members as to cushion the centrifugal member against its centrifugal force and against its sustension of the driving torque.

3. A centrifugal clutch as defined in claim 1 in which each centrifugal member is pivotally mounted on a stud projecting from the driving member and in which a bushing having substantially the resilient deformability of vulcanized soft-rubber is interposed between each of the studs and the respective centrifugal member.

4. A clutch as defined in claim 3 in which the recited bushing is freely rotatable upon the recited stud in the maintaining of balance between the centrifugal force and the force of the spring.

THOMAS L. FAWICK.

REFERENCES CITED

The following references are of record in the file of this patent:

UNITED STATES PATENTS

| Number | Name | Date |
|---|---|---|
| 919,523 | Barker | Apr. 27, 1909 |
| 1,870,649 | Rawson | Aug. 9, 1932 |
| 2,005,250 | Wemp | June 18, 1935 |
| 2,166,165 | Linderman | July 18, 1939 |
| 2,375,909 | Fawick | May 15, 1945 |
| 2,428,552 | Butler | Oct. 7, 1947 |
| 2,471,747 | Hinden et al. | May 31, 1949 |
| 2,534,426 | Eason | Dec. 19, 1950 |

FOREIGN PATENTS

| Number | Country | Date |
|---|---|---|
| 273,918 | Great Britain | July 14, 1927 |
| 410,252 | Great Britain | May 17, 1934 |
| 579,385 | Germany | June 8, 1933 |
| 2,236 | Netherland | Nov. 1, 1917 |